United States Patent [19]

Corrado et al.

[11] 4,195,811
[45] Apr. 1, 1980

[54] ELECTRONIC VALVE CONTROL MEANS

[75] Inventors: Anthony P. Corrado, Totowa; Vincent P. Marchese, Morris Township, Morris County; Frank S. Morici, Haskell; Frank W. Timte, Budd Lake, all of N.J.

[73] Assignee: EMX Controls Inc., Cedar Grove, N.J.

[21] Appl. No.: 826,891

[22] Filed: Aug. 22, 1977

[51] Int. Cl.² .......................................... F16K 31/02
[52] U.S. Cl. ..................................... 251/30; 251/141
[58] Field of Search ......................... 251/30, 129, 141

[56] References Cited

U.S. PATENT DOCUMENTS

| | | | |
|---|---|---|---|
| 2,651,326 | 9/1953 | Ray | 251/30 |
| 3,029,743 | 4/1962 | Johns | 251/129 |
| 3,038,500 | 6/1962 | Lansky et al. | 251/30 |
| 3,152,612 | 10/1964 | Avery | 251/141 |
| 3,524,474 | 8/1970 | McCormick | 251/129 |
| 3,934,816 | 1/1976 | Terrell et al. | 251/141 |
| 3,981,480 | 9/1976 | Eernisse et al. | 251/129 |

Primary Examiner—Martin P. Schwadron
Assistant Examiner—G. L. Walton
Attorney, Agent, or Firm—Salter & Michaelson

[57] ABSTRACT

A valve which is normally biased in a first operative position is provided with control means including a first pressure fluid orifice for directing such fluid to a control member for changing the operative position of the valve. The device further includes a housing which communicates with said first orifice and which has a bleed orifice assembly having a second or bleed orifice. The bleed orifice assembly further includes a bleeder valve seat and a piezoelectric crystal mounted adjacent thereto so that upon bending of the crystal, as by energization thereof, pressure contact is made with an intermediate valve element. The valve element is in turn adapted to move against the bleeder valve seat to close the same. When the bleed orifice assembly is closed in the manner above described, pressure is permitted to build up in the first orifice to activate the valve.

3 Claims, 2 Drawing Figures

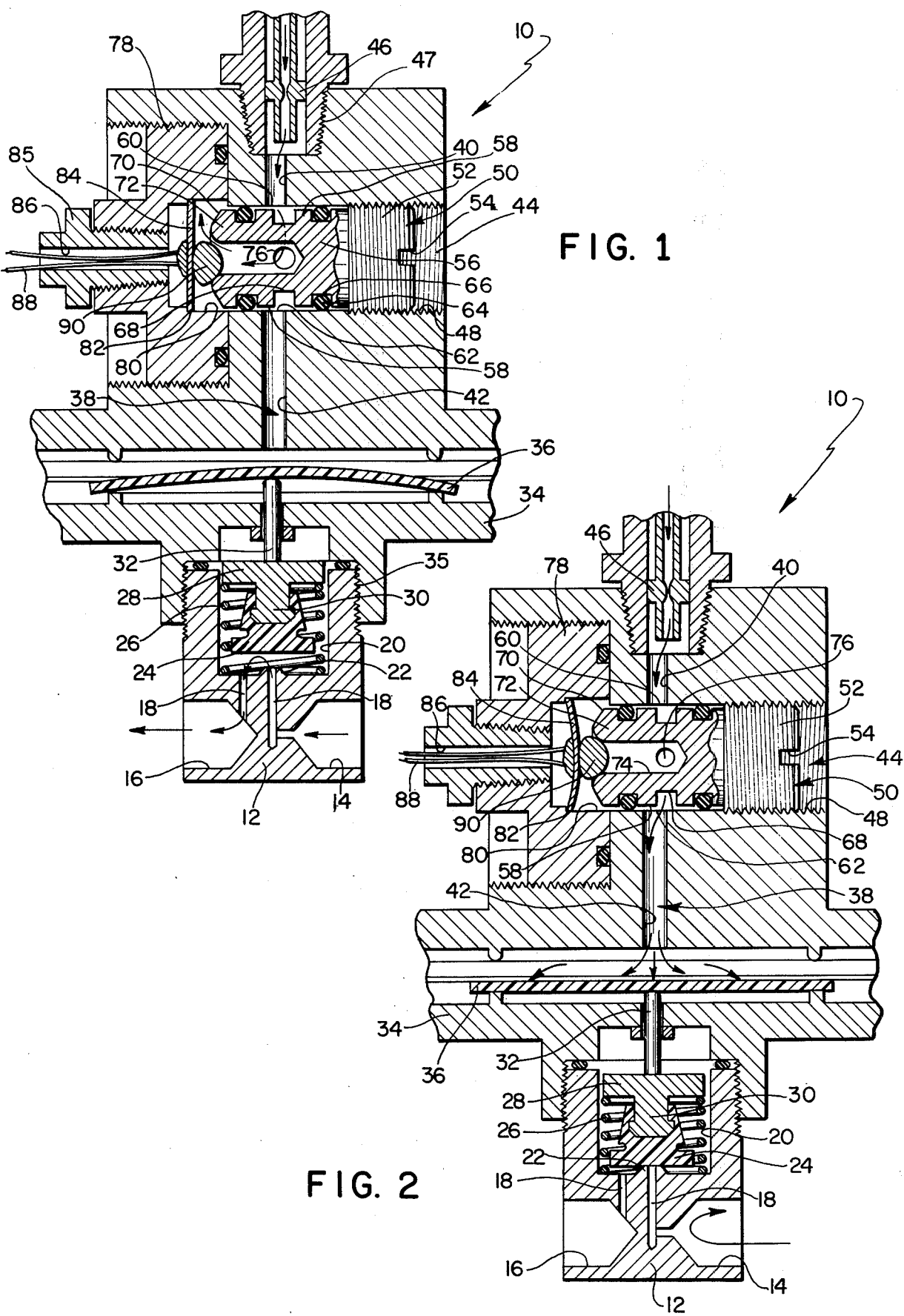

ELECTRONIC VALVE CONTROL MEANS

BACKGROUND OF THE INVENTION

This invention relates to an electronic valve and more particularly to a device which generally converts DC power into pneumatic output signals so that fluid flow through the valve may be controlled. Certain known crystalline materials exhibit a piezoelectric effect, that is, they expand upon energization, generally the application of electrical energy thereto. The power needed to effect such phenomena consumes extremely little electrical energy inasmuch as such piezoelectric crystals essentially operate as electrical capacitors and thus are almost totally voltage activated.

Suggested valve constructions of this general type are set forth in the following U.S. Pat. Nos. 3,029,743 issued Apr. 7, 1962; 3,524,474 issued Aug. 18, 1970; and 3,981,480 issued Sept. 21, 1976. In U.S. Pat. No. 3,029,743 such a piezoelectric crystal is mounted in a cantilever position through an interconnected conical element to open and close a fluid orifice. In U.S. Pat. No. 3,524,474 an edge mounted piezoelectric crystal to which a valve member 44 is attached is utilized to directly close an orifice 18; while in U.S. Pat. No. 3,981,480 a piezoelectric element in sleeve form is utilized in direct contact with orifices 16 and 20 to restrict or permit fluid flow therebetween. The above citations and discussion of these patents constitutes applicant's Prior Art Statement, and in accordance therewith a copy of each such patent is included with the application.

Notwithstanding the above prior art constructions, the need still exists for a reliable valve control unit which is capable of operation under circumstances necessitating low power usage and which may accordingly be operated by a self-contained power source such as a battery, solar cell or the like. It is therefore a primary object of the present invention to provide a device for controlling a valve in which a peizoelectric crystal is energized to move or bend in such a manner so as to force a separate valve element into sealing contact with a valve seat.

A further object of the invention is the provision of a valve of the aforementioned type in which various components thereof are interchangeable without affecting the operation thereof.

A still further object of the present invention is the provision of a valve of the aforementioned type in which maximum power may be achieved from the deflection of the piezoelectric crystal so as to effectively open and close a bleed orifice assembly which in turn controls the operation of a valve.

These and other objects of the present invention are achieved by the provision of a control device having a housing associated with a valve normally biased in a first position, said housing including a first fluid orifice for directing a control fluid under pressure to a control element for changing the normal valve attitude. The housing further includes a bleed orifice assembly having a beam mounted piezoelectric crystal disposed in opposed relationship to a valve seat and a separate valve element disposed therebetween so that upon actuation thereof, the crystal laterally bends in central portions thereof so as to force such element into closing engagement with the valve seat thus maximizing the bending force imparted thereto.

Other objects, features and advantages of the invention shall become apparent as the description thereof proceeds when considered in connection with the accompanying illustrative drawings.

DESCRIPTION OF THE DRAWING

In the drawing which illustrates the best mode presently contemplated for carrying out the present invention:

FIG. 1 is a sectional view of a valve assembly depicted in a normal open attitude permitting the flow of fluid therethrough in which the control device of the present invention is utilized; and FIG. 2 is a side sectional view similar to FIG. 1 showing the valve assembly of the present invention with the bleed orifice assembly thereof closed, thus permitting pressure to build up to move the valve to a closed non-fluid flow position.

DESCRIPTION OF THE INVENTION

The control device 10 of the present invention is adapted for use with a valve 12. Such valve is of conventional construction and includes an inlet 14, an outlet 16 and connecting channel portions 18 which both communicate with an intermediate chamber 20. The first portion of the connecting channel 18 as it enters into the chamber 20 is provided with a valve seat 22. A spring 26 normally upwardly biases a closure element 24 away from contact with the valve seat 22, and accordingly permits fluid to normally flow through the valve 12 as indicated by the arrows in FIG. 1 which illustrate the normal fluid flow path through valve 12.

The closure member 24 is connected to a piston 28 by means of a headed boss 30. This piston is free to slide longitudinally within the chamber 20 and further includes a rod 32 upwardly and slidably extending into a housing 34 which is threadably connected to the valve 12 as at 35. A diaphragm 36 of known construction is positioned so as to be in engagement with the top free end of rod 32 and is mounted in any operative manner so that downward pressure thereon will in turn be transmitted through the rod 32 and piston 28 to the closure element 24 thus forcing the latter downwardly against the action of spring 26 to the closed position illustrated in FIG. 2.

In order to control operation of the diaphragm, housing 34 includes a first orifice 38 having first and second portions 40 and 42, respectively. Such portions 40, 42 communicate with an intermediate cylindrical bore 44 laterally extending into the housing 34 and serving as a chamber through which pressurized fluid may pass. A restrictor member 46, threadedly attached to housing 34 as at 47, serves to meter the volume and accordingly the pressure of fluid from an outside source (not shown) into the first orifice 38, said pressurized fluid functioning to control the opening and closing of the valve 12 in a manner hereinafter to be described. The bore 44 is provided with threads 48 for receipt of a plug 50 having an externally threaded head 52 having a lateral slot 54 by which the position of the plug 50 with respect to the bore 42 may be adjusted. The plug 50 includes a body portion 56 having outwardly extending peripheral portions or flanges 58 which define an annular groove 68 in alignment with ends 60, 62 of orifice portions 40, 42, respectively. O-rings 64 are provided within grooves 66 on the outer sides of the flanges 58 so as to create a fluid seal on either side thereof. The intermediate groove 68 circumferentially disposed about the periphery of the body 56 enables fluid passing through the restrictor 46 and the upper orifice section 40 to communicate with the remaining or lower portion 42 of the first orifice 38. The other end of the plug 56 is provided with a valve seat 70 formed by rounded shoulders 72 so as to define a concentric laterally extending opening or bore 74. A second or bleeder orifice 76 passes through the body 56 radially thereof and serves to interconnect the opening 74 with the groove 68.

The other end of the bore 44 is closed by means of a threaded member 78 having a rectangular recess 80 formed therein. The recess includes a peripheral step or shoulder 82 against which the peripheral portions of a generally rectangular piezoelectric crystal may be placed for retention thereby. A plug member 85 having a bore 86 is threadedly attached to member 78 so that energizing means for the piezoelectric crystal 84, such as the electrical wires 88, may pass through the bore 86 for connection to the back of the crystal in a known manner, such as by conductive epoxy cement. Interposed between the end of bore 74 and the piezoelectric crystal 84 is a valve element 90 generally of partially spherical shape and retained in such position by reason of its lateral extent being slightly greater than the space between the crystal 84 and the outer rounded edges 72 of the valve seat 70. The valve element may also be otherwise rounded, i.e. conical, and its shape enables it to contact the valve seat 70 in substantial line contact, thus transmitting a maximum amount of the force imparted thereto by the bending movement of the crystal 84 to effect a tight seal at the end of bore 74. The surface of the valve element proximal to the crystal 84 may also be centrally rounded as shown so that the crystal flexure or bending force is concentrated centrally thereof. Generally such valve element 90 is of accurately machined, uncoated metal so that a metal to metal seal between such and the bleeder valve seat 70 can take place. In some instances, however, it may be desirable to coat such valve element 90 and/or the valve seat 70 with an elastromeric covering so that machining inaccuracies and the like may be compensated for.

It may thus be seen that when the piezoelectric crystal 84 is activated so as to impart a lateral bending or deformation to the central unrestrained portion thereof, such bending is transmitted into a lateral movement of the valve element 90 against the valve orifice 70. Such action closes the bleeder valve assembly and thus will permit a buildup of fluid pressure within the first orifice 38, thus activating the diaphragm 36 downwardly so as to, as previously described, close the valve 12. Normally, in the unactivated position of the piezoelectric crystal a portion of such fluid moving within the first orifice 38 is bled off to atmosphere through the open bore 74, whereupon insufficient pressure is built up to operate the diaphragm 36.

In operation, the amount of pressure which may be transmitted through the first orifice 38 is regulated by the lateral movement or adjustment of the plug 50 within the bore 44, it being obvious that the placement of the body 56 will affect the tightness of the seal between element 90 and valve seat 70 when the crystal 84 has been energized, as illustrated in FIG. 2, and also will determine the extent of bleed when the crystal is not energized, as shown in FIG. 1. In order to insure that there is no slip or lateral movement of the plug 50 with respect to the bore 44, the threads mutually provided therein are of a very fine pitch. Alternatively, springs (not shown) could also be utilized to prevent any such potential thread backlash. Thereafter, as fluid from the outside source, such as pressurized gas supply or the like, enters the first orifice 38 and is partially vented through the bleed assembly, operation of the valve 12 in its first operative mode takes place. When it is desired to change such operative mode, i.e. open or close the valve depending on its first attitude, an activating impulse is provided to the piezoelectric crystal 84. Normally such impulse is in the form of an electrical voltage drop supplied from a DC battery source, although other sources of energy may be utilized, such as a solar cell or pulsed light. Thereafter the crystal bends and exerts a maximum lateral motion in the central portions thereof by reason of its beam support at opposite edges thereof. Such lateral motion is transmitted into a driving force to close the separate valve element 90 with respect to the valve bore 74. Inasmuch as the crystal, plug and valve element are separate from each other, other similar members may be interchanged therefor should they become worn or should different characteristics be desired. Also, by reason of the beam mounting of the crystal as close to its edges as possible, the crystal is free to exercise maximum bending or deformation, without having to overcome any resistance, such as would inherently exist if the edges of the crystal were held by gripping or clamping means.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A device for controlling fluid flow through a valve, said valve being normally biased in one operative attitude comprising, a housing associated with said valve and including a movable control member movable from a first to a second position for changing said one operative attitude of said valve, said housing further including a first fluid orifice for directing a control fluid under pressure to said control member and to a bleed orifice assembly, said bleed orifice assembly having a second orifice communicating with said first orifice, said second orifice terminating in a normally open bleeder valve seat, a piezoelectric crystal mounted in said housing adjacent said valve seat, said crystal being mounted with peripheral edge support so that central portions thereof are free to move laterally towards said valve seat when said crystal is energized, a separate bleeder valve element disposed between said crystal and said valve seat, and means for energizing the crystal so as to deform same to force said bleeder valve element into contact with said bleeder valve seat to close said bleeder orifice thereby causing fluid pressure to build up in said first orifice so as to cause said control member to move to said second position, said bleed orifice assembly including a plug disposed within a bore interrupting said first orifice, said plug having means for connecting said interrupted portions of said first orifice and means for connecting said bleed orifice to said first orifice.

2. The device set forth in claim 1, said valve seat formed at one end of said plug.

3. The device of claim 2, said bore being circular and having a circumferential path for connecting said interrupted portions of said first orifice, said plug having peripheral wall portions in contact with said bore on opposite sides of said path, said plug laterally movable within said bore so as to adjustably position said valve seat with respect to said crystal.

* * * * *